United States Patent Office 3,233,967
Patented Feb. 8, 1966

3,233,967
MANUFACTURE OF ALKALI METAL
TRIPOLYPHOSPHATES
Chung Yu Shen, Olivette, Mo., assignor to Monsanto
Company, a corporation of Delaware
No Drawing. Filed July 21, 1960, Ser. No. 44,255
5 Claims. (Cl. 23—106)

The present invention relates generally to the production of alkali metal tripolyphosphates, and in particular to a process for producing alkali metal tripolyphosphates in an agglomerated form of predetermined bulk density.

Manufacturers of tripolyphosphates have been hard pressed by the steadily increasing demand by their customers for tripolyphosphates having widely varying bulk densities. In order to supply tripolyphosphates which meet the various bulk density requirements of these customers, manufacturers have been forced to utilize a multiplicity of plants or processes, each of which can produce tripolyphosphates having only a very narrow range of bulk densities. The maintenance and operation of such a multiplicity of processes in order to produce what is essentially a single product (tripolyphosphate) is expensive, and undesirable in almost every respect.

An object of the present invention is to provide an improved process whereby one can produce an alkali metal tripolyphosphate having a predetermined bulk density. Another object of the present invention is to provide an improved process whereby one can produce alkali metal tripolyphosphates having varying predetermined bulk densities in a single unit or plant. Still another object of the present invention is to provide an improved process whereby one can produce agglomerated alkali metal tripolyphosphates having better resistance to friation than those presently available.

The above as well as other objects of the invention are achieved by mixing varying amounts of water with certain phosphate salts which are subsequently converted to tripolyphosphate in an agglomerating calciner. Prior to this invention, it was assumed that water should not be added to alkali metal orthophosphate salts which were to be converted to agglomerated tripolyphosphate because of the greater heat requirements of such systems if they contained water. It has been found, however, that the many advantages which result from practicing this invention more than compensate for the additional cost of evaporating the water, added as described herein. According to this novel process, alkali metal tripolyphosphate having very widely varying predetermined bulk densities can be produced in a single unit. The tripolyphosphates produced by this new process have the additional surprising advantages of being very resistant to friation, and being more dust-free than most of those heretofore produced.

In a process in accordance with this invention, an intimate mixture of finely divided orthophosphate salts is heated with agitation at a temperature which is sufficiently high to effect the conversion of the orthophosphate salts to tripolyphosphate, but below the melting point of the particular tripolyphosphate produced. This conversion temperature is usually between about 250° C. and about 550° C., and is preferably between about 350° C. and about 500° C.

The molecular ratio of alkali metal oxide to $P_2O_5$ in the blend of alkali metal orthophosphate salts charged to the calciner is generally greater than about 1.5 and less than 2.0, and is preferably between about 1.6 and about 1.80. When a tripolyphosphate with a particularly high assay is desired, for example, when it is intended for formulation into a heavy duty detergent, the molecular ratio of alkali metal oxide to $P_2O_5$ in the blend of alkali metal orthophosphate salts charged to the calciner is between about 1.65 and about 1.69.

The alkali metal orthophosphate salt blends which are particularly useful in the practice of the instant invention are composed of the various sodium and potassium salts of orthophosphoric acid. Several examples of these preferred or "appropriate" blends are listed below. It should be understood that these are merely examples. It is not intended that the practice of the instant invention be limited solely to the use of these blends. The figures for weight percent, below, are based on the total weight of the orthophosphate salt blend.

(1) 65 weight percent monosodium orthophosphate-disodium orthophosphate double salt and 35 weight percent disodium orthophosphate.
(2) 60 weight percent monosodium orthophosphate-disodium orthophosphate double salt and 40 weight percent disodium orthophosphate dihydrate.
(3) 25 weight percent monosodium orthophosphate and 75 weight percent disodium orthophosphate.
(4) 22 weight percent monosodium orthophosphate and 78 weight percent disodium orthophosphate dihydrate.
(5) 28 weight percent monopotassium orthophosphate and 72 weight percent dipotassium orthophosphate.
(6) 56 weight percent monopotassium orthophosphate and 44 weight percent tripotassium orthophosphate.
(7) The double salt hydrate,

$$KH_2PO_4 \cdot 2K_2HPO_4 \cdot H_2O$$

The time required for conversion of the orthophosphate salts to tripolyphosphate in this process will vary somewhat, depending upon such factors as temperature, particular orthophosphate reactants, the desired degree of conversion to tripolyphosphate, etc. Usually, appreciable conversion to tripolyphosphate will have occurred in about 15 minutes, at, for example, about 400° C. Of course, at lower temperatures the rate of conversion is not as high as it is at relatively higher temperatures. Generally, however, satisfactory conversion to tripolyphosphate occurs in about 25 minutes, while substantially complete conversion usually requires about 40 minutes at about 300° C. provided the starting orthophosphate salts are well blended and in a finely divided state. If desired, even longer periods of exposure to temperatures above 250° C. can be utilized without adversely affecting the desirable products of this invention, but as a practical matter the heating operation should generally be limited to a total of no more than about 120 minutes.

The choice of particle size of the orthophosphate reactants is somewhat dependent, too, on the desired assay of tripolyphosphate in the final product. Generally, for a given blend of orthophosphate salts, the smaller the particles (which are intermixed either before or during the heating step of the conversion process) the higher is the assay of the tripolyphosphate product. Commercially, satisfactory products usually result if at least about 80 weight percent of the orthophosphate salts which are fed to the calciner will pass through a U.S. Standard 60 mesh screen. It is preferred, however, that at least about 80 weight percent of the particles of alkali metal orthophosphate be small enough to pass through a U.S. Standard 100 mesh screen. Throughout the remainder of this application, the term "finely divided" will signify material which consists of particles so small that at least about 80 weight percent of them will pass through a U.S. Standard 60 mesh screen.

During the calcination or heating step of the process, continuous agitation and tumbling together of the particles being heated is desirable. Any conventional apparatus with which one can produce an agglomerated form of the tripolyphosphate is suitable for the practice of this invention. For example, an excellent type of continuous agitation, where jostling and tumbling together of the particles being heated occur, is produced when a rotary calciner like that described in the examples, below, but larger, of course, is utilized for the conversion of orthophosphates to tripolyphosphate.

Another example of conventional apparatus which can be employed to provide suitable agitation during the calcination of the orthophosphate blend is a screw conveyor, heated either directly or indirectly. In the screw conveyor, the rotation of the screw pushes and jostles the particles almost continuously, and produces an agglomerated or granulated tripolyphosphate product.

The predetermined quantity of water which must be added to the finely divided alkali metal orthophosphate salts in order to produce alkali metal tripolyphosphates of varying predetermined densities can be added by one or more of several available means. For example, water can be added to the orthophosphate salts after they have been charged to the calciner, just prior to the heating step in the conversion process. This method is illustrated in Example 1, below. Other methods for the addition of the predetermined quantity of water to the finely divided alkali metal orthophosphate salts prior to their conversion to tripolyphosphate will be obvious to those skilled in the art. For example, water can be mixed with the blend of orthophosphate salts just prior to their introduction to the calciner. The water can also be mixed with one or more of the individual materials before they are fed to the calciner. Also, the water can be mixed with either the monosodium orthophosphate or the disodium orthophosphate (or with both) salts prior to their being blended and calcined according to the instant process. Sometimes, at least part of one or more of the orthophosphate salts is dissolved in the water prior to its addition to the remaining materials which are to be calcined. For example, water containing monopotassium orthophosphate and/or dipotassium orthophosphate can be mixed with a blend of monopotassium and dipotassium orthophosphate salts (which are to be calcined according to the instant process) in any of the ways discussed above.

The amount of water which is mixed into the blend of finely divided alkali metal orthophosphate salts according to the instant invention depends primarily upon the bulk density of the tripolyphosphate product which one desires. Generally the amount of water mixed into the finely divided materials which are fed into the calciner according to the above-described process is between about 1 weight percent and about 20 weight percent, based on the total weight of the materials charged to the calciner. In most instances there is desired a tripolyphosphate having a bulk density which requires that between about 5 weight percent and about 15 weight percent of water be added, but for unusual applications, the desired product density may be such as to necessitate the addition of no more than about 10 weight percent of water to the materials which are to be converted into alkali metal tripolyphosphates.

For a given set of conditions and blend of alkali metal orthophosphate salts, the increase in density of the tripolyphosphate product is almost proportional to the amount of water which is added to the orthophosphate salts before they are calcined. For example, if one produces agglomerated sodium tripolyphosphate having a bulk density of 0.40 g./cc. when he calcines a blend of monosodium orthophosphate and disodium orthophosphate, he cannot, by practicing the usual procedure, produce in the same equipment an agglomerated product having a density greater than about 0.60 g./cc. If he adds a certain amount of water to his sodium orthophosphate salt blend according to the instant invention, however, he can produce agglomerated sodium tripolyphosphates having a density of 0.70 g./cc. By adding even more water, he can produce agglomerated or granular products having densities as high as 1.1 g./cc.

Table I shows that one can increase or decrease the density of his final agglomerated tripolyphosphate product by increasing or decreasing, respectively, the amount of water which he adds to the blend of phosphate salts, according to the instant invention.

TABLE I

*Effect of water on density of sodium tripolyphosphate* [1]

| Percent water added: | Bulk Density (g./cc.) |
|---|---|
| 0 | 0.419 |
| 5.2 | 0.580 |
| 9.7 | 0.895 |
| 13.5 | 0.937 |

[1] −20, +100 mesh screen fraction.

In order for the water to be effective in controlling the density of agglomerated alkali metal tripolyphosphates, made according to the instant invention, the water must be present in the blend of orthophosphate salts while they are being heated. It is essential that the water be not flashed from the orthophosphates immediately after it is mixed with them. Therefore, the temperature of the orthophosphate salt blend should be below the boiling point of a solution saturated with the particular orthophosphate salts being utilized during the addition of the water in the practice of this invention. Generally these temperatures are below about 108–110° C. The presence of varying amounts of water vapor in the atmosphere over the mixture being calcined has no appreciable effect on the product density.

For optimum results, it is also desirable to thoroughly intermix the water and the alkali metal orthophosphate salts before the water is completely evaporated. Usually, efficient distribution of the water is accomplished simply by agitating the mixture during the calcination process. The agitation contemplated herein has already been discussed above.

EXAMPLE 1

A blend of sodium orthophosphate salts having a molecular ratio of $Na_2O$ to $P_2O_5$ to 1.65 is prepared by reacting 1200 grams of $Na_2CO_3$ with 1580 grams of 85% $H_3PO_4$. The resulting slurry is flash-dried on a valley feed drum dryer operated at 60 p.s.i.g. steam pressure, dried still more overnight at 110° C., and then milled to pass through a U.S. Standard 100 mesh screen. Three hundred grams of the milled feed are calcined in a 6-inch diameter by 9-inch long stainless steel rotating drum, heated externally by a gas burner. Any material which cakes on the walls of the drum as it revolves is knocked down with a small hammer. Twelve grams of water are sprayed onto the tumbling orthophosphate feed material just after the calciner is charged. The calciner is rotated at 40 r.p.m. and operated at an outside wall temperature of 400° C. for 30 minutes. At the end of this time, the sodium tripolyphosphate product is discharged, cooled to room temperature, and then screened over a U.S. Standard 100 mesh screen. The +100 mesh fraction represents 87.5 weight percent of the product. The density of this +100 mesh screen fraction is 0.546 gram per cubic centimeter.

By comparison, the calcination of three hundred grams of a similar sodium orthophosphate salt blend, but without the added water, yields a product having a density (based on the corresponding +100 mesh screen fraction) of only 0.348 gram per cubic centimeter.

EXAMPLE 2

Three hundred grams of a blend of finely divided sodium orthophosphate salts like that used in Example 1 are charged into the rotary calciner described in Example 1. Twenty-nine grams of water are sprayed onto the tumbling orthophosphate salts in the canciner just after the calciner is charged. The calciner is rotated at 40 r.p.m. and operated at an outside wall temperature of 400° C. for 30 minutes. At the end of this time, the sodium tripolyphosphate product is discharged, cooled to room temperature and screened over a U.S. Standard 100 mesh screen. The density of the +100 mesh screen fraction is 0.840 grams per cubic centimeter.

It is in no way intended that the application of the instant invention be limited to processes wherein alkali metal orthophosphate salts are converted to alkali metal tripolyphosphates in the absence of other compounds or materials. In fact, it is often desirable to convert the orthophosphates to tripolyphosphate in the presence of materials which do not enter into the conversion reaction, as well as materials (other than the orthophosphates) which do enter into the conversion reaction, such as alkali metal pyrophosphates, alkali metal metaphosphates, etc. Small amounts of oxidants, such as nitric acid, etc., which are used to improve product color, have no deleterious effects on the improved products resulting from the practice of the instant invention. The surprising and desirable benefits of the instant invention can be gained, for example, when finely divided sodium orthophosphates are mixed and calcined together with finely divided sodium tripolyphosphate. These benefits are illustrated in Examples 3 and 4 below and Table 1, above.

EXAMPLE 3

Two hundred twenty-five grams of finely divided sodium tripolyphosphate are blended with 55 grams of finely divided disodium orthophosphate and 20 grams of finely divided monosodium orthophosphate. The molar ratio of $Na_2O$ to $P_2O_5$ in the orthophosphate fraction is 1.70. This blend of sodium tripolyphosphate and sodium orthophosphates is charged into the calciner described in Example 1. While the calciner is rotated at 40 r.p.m., 15.6 grams of water are sprayed onto the tumbling powders inside. The temperature of the outside wall of the calciner is then maintained at 400° C. for 30 minutes while the rotation of the calciner is continued. At the end of this period of time, the product is discharged from the calciner, cooled to room temperature, and screened. The product contains 94.8 grams of sodium tripolyphosphate having particles which pass through a U.S. Standard 20 mesh screen, but do not pass through a U.S. Standard 100 mesh screen. The density of this —20, +100 mesh screen fraction is 0.580 gram per cubic centimeter.

By comparison, the calcination of three hundred grams of a similar mixture of sodium tripolyphosphate and sodium orthophosphates, but without the added water, yields a product, the —20, +100 mesh screened fraction of which has a density of only 0.419 gram per cubic centimeter.

EXAMPLE 4

A blend of sodium orthophosphate salts having a molecular ratio of $Na_2O$ to $P_2O_5$ of 1.71 is prepared by reacting 600 grams of $Na_2CO_3$ with 763 grams of 85% $H_3PO_4$. The resulting slurry is flash dried on a steam heated steel roll, further dried overnight at 110° C., and then milled to pass through a U.S. Standard 100 mesh screen. Two hundred twenty-five grams of this orthophosphate salt blend, intermixed with seventy-five grams of finely divided sodium tripolyphosphate are added to the rotary calciner described in Example 1.

Just after the calciner is charged with the orthophosphate-tripolyphosphate mixture, 15.6 grams of water are sprayed onto the tumbling powders in the calciner. The calciner is rotated at 40 r.p.m. and operated at an outside wall temperature of 450° C. for 40 minutes. At the end of this time, the sodium tripolyphosphate product is discharged from the calciner, cooled to room temperature, and screened. The —20, +100 mesh screen fraction of this product had a density of 0.547 grams per cubic centimeter. By comparison, the calcination of three hundred grams of similar mixture of sodium tripolyphosphate and sodium orthophosphates but without added water, yields a product, the —20, +100 mesh screen fraction of which has a density of 0.390 gram per cubic centimeter.

The granules of sodium tripolyphosphate produced by practicing the instant invention have a greater resistance to friation than do those which are made in the absence of added water. This fact is illustrated in Table II, below. The "rigidity number" in Table II is derived as follows:

One hundred grams of the —20, +100 mesh screen fraction of the particular sodium tripolyphosphate product being tested is placed on a 100 mesh U.S. Standard screen, along with three one-inch rubber balls. The sample and rubber balls are then shaken by means of a "Ro-Tap" sieve shaking machine for 30 minutes. At the end of this time the amount of sodium tripolyphosphate that has passed through the 100 mesh screen is weighed. The material which passes through the screen results from the breaking down of the original agglomerated tripolyphosphate particles due to the pounding of the rubber balls. The weight is grams of material which passes through the 100 mesh screen is termed the "rigidity number." The sodium tripolyphosphate products having relatively higher "rigidity numbers" in Table II are more friable (more easily broken down to produce irritating dust on handling, etc.) than are those that have relatively lower "rigidity numbers." Note that the products in Table II which demonstrate the greater resistance to friation are those which were made according to the instant invention.

TABLE II

Relative friability of sodium tripolyphosphate products [1]

| Product From | Added Water? | Rigidity Number [2] |
| --- | --- | --- |
| Example 1 | Yes | 2 |
|  | No | 13 |
| Example 2 | Yes | 2 |
|  | No | 10 |
| Example 3 | Yes | 2–3 |
|  | No | 10 |
| Example 4 | Yes | 2–3 |
|  | No | 8–10 |

[1] —20, +100 mesh screen fractions, 100 grams each.
[2] Grams through 100 mesh screen after 30 minutes on "Ro-Tap" with 3 one-inch diameter rubber balls.

Obviously, modifications and variations of the invention as hereinbefore set forth can be made without departing from the spirit and scope thereof.

What is claimed is:

1. A method for regulating the bulk density and improving the friability of a particulated, agglomerated alkali metal tripolyphosphate within the range of from about 0.4 to about 1.1 grams per cubic centimeter which comprises heating a composition initially comprising an intimate admixture of an appropriate blend of solid finely divided alkali metal orthophosphate salts and a predetermined quantity of liquid water within the range of from about 1% to about 20% of the weight of said orthophosphate salts to a temperature between about 250° C. and about 550° C.; said quantity of liquid water varying in approximately a direct proportion to said predetermined density; maintaining said temperature until a substantial conversion of said orthophosphate salts to alkali metal tripolyphosphate is effected, and then recovering said particulated, agglomerated tripolyphosphate; at least about 80 weight percent of the particles of said finely divided alkali metal orthophosphate salts being small enough to pass through a U.S. Standard 60 mesh screen.

2. In a process for producing a particulated, agglomerated sodium tripolyphosphate which comprises heating with agitation an appropriate blend of solid finely divided sodium orthophosphate salts to produce essentially sodium tripolyphosphate; at least about 80 weight percent of the particles of said finely divided sodium orthophosphate salts being small enough to pass through a U.S. Standard 60 mesh screen; the improvement which comprises first intermixing with said sodium orthophosphate salts at a temperature below about 110° C. an amount of liquid water equal to between about 5% and about 15% of the total weight of said sodium orthophosphate salts and thereafter heating the initial mixture of said sodium orthophosphate salts and said water with agitation, to a temperature between about 250° C. and about 550° C., maintaining said temperature until a substantial conversion of said sodium orthophosphate salts to sodium tripolyphosphate is effected, and then recovering said particulated, agglomerated sodium tripolyphosphate from the calciner; whereby there is produced a less friable particulated, agglomerated sodium tripolyphosphate having a bulk density within the range of from about 0.4 to about 1.1 grams per cubic centimeter; said bulk density varying in approximately direct proportion to said amount of liquid water.

3. In a process for manufacturing particulated, agglomerated sodium tripolyphosphate which comprises heating with agitation, at a temperature between about 250° C. and about 550° C., a blend containing solid sodium orthophosphate salts; at least about 80 weight percent of the particles of said salts being small enough to pass through a U.S. Standard 100 mesh screen; having an overall molar ratio of $Na_2O$ to $P_2O_5$ between about 1.60 to about 1.80, maintaining said temperature until a substantial conversion of said sodium orthophosphate salts to sodium tripolyphosphate is effected, and then recovering said particulated, agglomerated sodium tripolyphosphate from the calciner; the improvement which comprises heating said sodium orthophosphate salts initially in intimate admixture with an amount of liquid water equal to between about 1 percent and about 20 percent of the total weight of said blend, whereby there is obtained a less friable particulated, agglomerated product having a bulk density within the range of from about 0.4 to about 1.1 grams per cubic centimeter; said bulk density varying in approximately direct proportion to said amount of said water.

4. In a process for producing particulated, agglomerated sodium tripolyphosphate which comprises heating an appropriate blend of solid sodium orthophosphate salts; at least about 80 weight percent of the particles of said sodium orthophosphate salts being small enough to pass through a U.S. Standard 100 mesh screen, to produce sodium tripolyphosphate, the improvement which comprises intermixing with the said sodium orthophosphate salts at a temperature below about 108° C. an amount of liquid water equal to between about 5 percent and about 10 percent of the total weight of sodium orthophosphate salts, thereafter heating the resulting initial mixture of said sodium orthophosphate salts and water to a temperature between about 350° C. and about 500° C., maintaining said temperature until a substantial conversion of said sodium orthophosphate salts to sodium tripolyphosphate is effected, and recovering the resulting particulated, agglomerated sodium tripolyphosphate from the calciner, whereby there is obtained a less friable particulated, agglomerated sodium tripolyphosphate product having a bulk density within the range of from about 0.4 to about 1.1; said bulk density varying in approximately direct proportion to said amount of said water.

5. A process for regulating the bulk density and improving the friability of a particulated, agglomerated alkali metal tripolyphosphate within the range of from about 0.4 to about 1.1 grams per cubic centimeter, which process comprises intermixing with solid finely divided alkali metal orthophosphate salts; at least about 80 weight percent of said finely divided alkali metal orthophosphate salts being small enough to pass through a U.S. Standard 100 mesh screen; at a temperature below about 110° C., an amount of liquid water equal to from about 1% to about 20% of the total weight of said orthophosphate salts, and thereafter calcining the resulting mixture with agitation at a temperature of from 250° C. to about 550° C. by maintaining said temperature until the substantial conversion of said orthophosphate salts to alkali metal tripolyphosphate is effected, and recovering said particulated, agglomerated alkali metal tripolyphosphate; said bulk density varying in approximately a direct proportion to said amount of said liquid water.

References Cited by the Examiner

UNITED STATES PATENTS

| 2,712,529 | 7/1955 | Mills et al. | 23—106 |
| 2,898,189 | 8/1959 | Rodis et al. | 23—106 |
| 3,030,180 | 4/1962 | Bigot | 23—106 |
| 3,110,559 | 11/1963 | Bigot | 23—107 |

MAURICE A. BRINDISI, *Primary Examiner.*